United States Patent
McKenzie et al.

(10) Patent No.: US 12,125,239 B2
(45) Date of Patent: Oct. 22, 2024

(54) SYSTEMS AND METHODS FOR DETECTING OBJECTS CROSSING PLANES

(71) Applicant: Retrospect LLC, Casper, WY (US)

(72) Inventors: Kyle McKenzie, The Colony, TX (US); Christopher David, Encinitas, CA (US); Justin Nash, Carlsbad, CA (US); Matthew Cristina, San Diego, CA (US); Wesley Ian Falik, New York, NY (US)

(*) Notice: Subject to any disclaimer, the term of this patent is extended or adjusted under 35 U.S.C. 154(b) by 342 days.

(21) Appl. No.: 17/560,149

(22) Filed: Dec. 22, 2021

(65) Prior Publication Data
US 2022/0198705 A1 Jun. 23, 2022

Related U.S. Application Data

(60) Provisional application No. 63/129,186, filed on Dec. 22, 2020.

(51) Int. Cl.
G06T 7/00 (2017.01)
A63B 71/06 (2006.01)
G06T 7/73 (2017.01)

(52) U.S. Cl.
CPC ............ *G06T 7/74* (2017.01); *A63B 71/0605* (2013.01); *A63B 2220/89* (2013.01); *A63B 2243/007* (2013.01); *G06T 2207/30224* (2013.01); *G06T 2207/30228* (2013.01)

(58) Field of Classification Search
CPC ............ G06T 7/74; G06T 2207/30224; G06T 2207/30228; A63B 71/0605; A63B 2220/89; A63B 2243/007; G06V 10/143; G06V 10/145; G06V 20/42
See application file for complete search history.

(56) References Cited

U.S. PATENT DOCUMENTS

| | | | |
|---|---|---|---|
| 8,199,199 B1* | 6/2012 | Shlyak | G06T 7/70 348/157 |
| 9,398,213 B1* | 7/2016 | Cronin | A63B 63/004 |
| 11,445,132 B2* | 9/2022 | Glasmacher | H04N 5/33 |
| 2017/0102480 A1* | 4/2017 | Rosenblum | G06V 10/145 |
| 2017/0161913 A1* | 6/2017 | Khazanov | G06T 7/292 |
| 2020/0054930 A1* | 2/2020 | Simón Vilar | G06V 20/20 |
| 2021/0182634 A1* | 6/2021 | Tazik | G01N 21/65 |

* cited by examiner

*Primary Examiner* — Ping Y Hsieh
(74) *Attorney, Agent, or Firm* — Camuti Law Group, APC; Nathan Camuti

(57) ABSTRACT

There is provided a system for detecting an object crossing a plane at high resolution from long range, the system including a first transmitter projecting a light plane using a light comprising a light plane wavelength, the light plane defining a boundary, wherein the light plane wavelength is not visible to the human eye, a first receiver for detecting a reflection of light when an object crosses the light plane defining the boundary, the receiver configured to detect light in a range of the electromagnetic spectrum including the light plane wavelength, wherein the receiver includes an image sensor comprising a plurality of sensor pixels, and an image processing computer configured to receive an input from the receiver including a recorded frame captured by the receiver, wherein the image processing computer processes the recorded frame for review to identify a frame showing an object crossing the boundary.

20 Claims, 10 Drawing Sheets

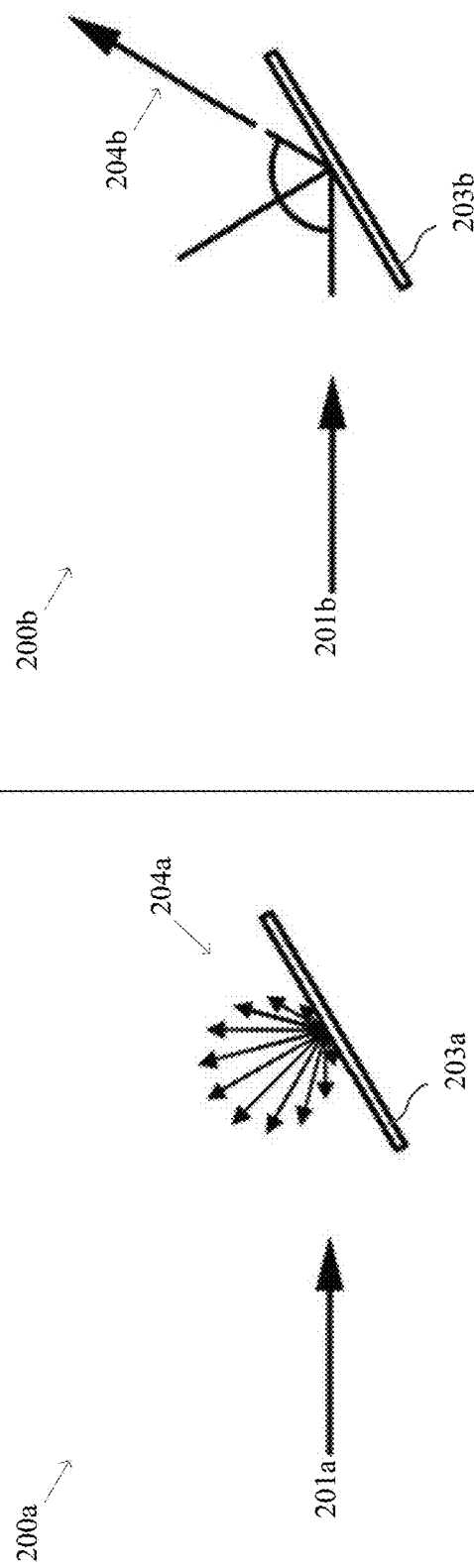
FIGURE 2a
FIGURE 2b
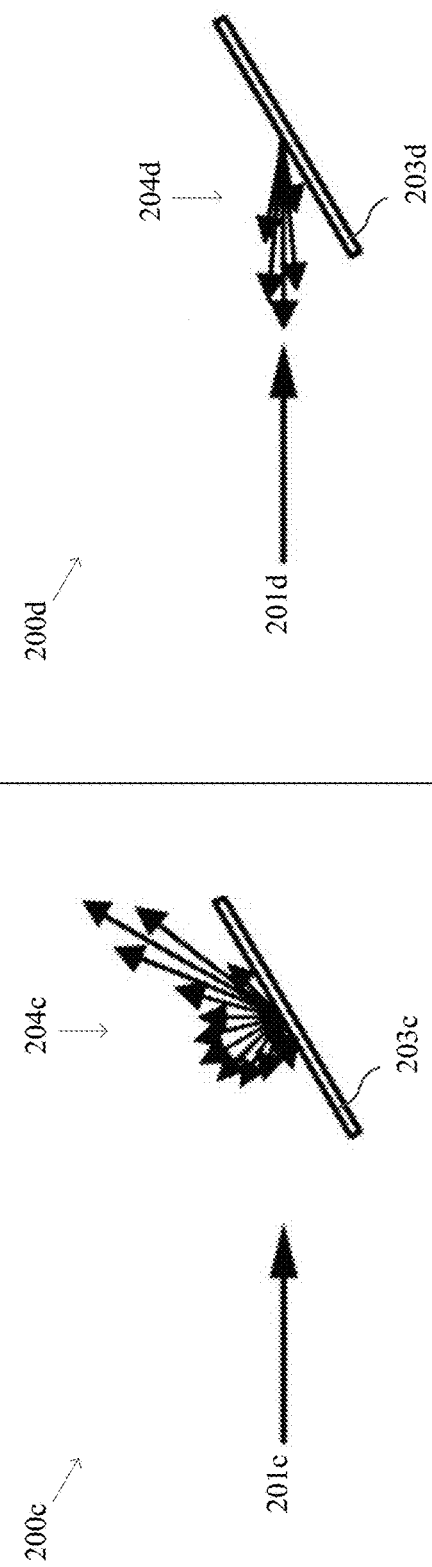
FIGURE 2c
FIGURE 2d

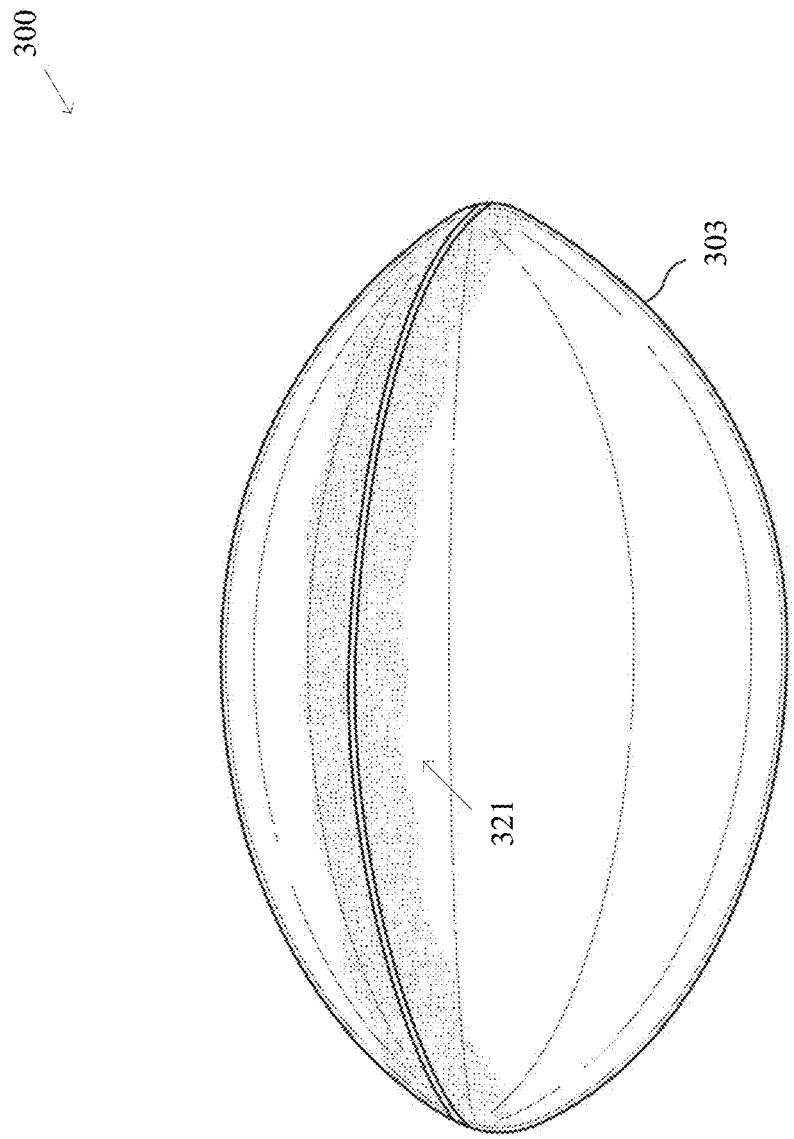

SYSTEMS AND METHODS FOR DETECTING OBJECTS CROSSING PLANES

RELATED APPLICATION

The present application claims the benefit of and priority to a U.S. Provisional Patent Application Ser. No. 63/129,186, filed Dec. 22, 2020, which is hereby incorporated by reference in its entirety into the present application.

BACKGROUND

Presently, touchdowns in American Football are determined by inferring whether the football has successfully broken the goal plane by judging its relative position with respect to the goal line below it. The end zone threshold is actually established by a two-dimensional plane situated at the front edge of the goal line, orthogonal to the plane of the playing field, and extending upwards to infinity. Although this plane is inherently objective by the rules of the game, the relative location of the football with respect to the plane can at times be subjective given referee and/or replay camera(s) viewing angle(s) This fact has led to inconsistent officiating, controversial decisions, and missed calls, and will surely continue unless a completely new goal line technology is implemented.

SUMMARY

The present disclosure is directed to systems and methods for detecting objects crossing planes at sub-centimeter resolution, substantially as shown in and/or described in connection with at least one of the figures, as set forth more completely in the claims.

The present disclosure provides a novel approach to solving this fundamental issue by implementing the following system:
   a. Project a coherent laser line source to create a 2-dimensional light plane that accurately and unambiguously represents the official football goal plane. The laser is low powered and eye-safe, which is required for public deployment, and invisible to prevent distractions to players or fans.
   b. Co-locate a high-resolution full-motion video camera that is sensitive to the laser wavelength, which is aimed at the goal line, and can see the overall 2-D goal plane. This camera provides a live feed to a central operations center (for example, the Art McNally Game Day Central—the National Football League (NFL) officiating center).
   c. Treat the football with a retroreflective material that is designed to be especially effective (bright) at the laser wavelength(s).

During a live play, when any portion of the ball interacts with the light plane, the ball will reflect a detectable retroreflective flash in the direction of the laser source (and co-located camera/receiver). The camera and receiver can be configured to provide a continuous live feed which can be used to record and replay the events of the ball transitioning through the plane.

The detectable flash phenomenon represents the positive crossing of the goal plane and is definitive because the only way this flash can be created is when the reflection resulting from the ball positively touching the light plane. This process is recorded in full-motion video which allows the detection event to be spatially fused and/or time-aligned with the overall game context. Once it is established that the football did indeed cross the light plane that represents the end zone threshold, game officials can then determine whether the ball carrier was otherwise down or out-of-bounds before the boundary crossing event occurred to make an official "touchdown" or "no touchdown" call. As such, the system is employed not to autonomously determine the outcome, but to reduce or remove the subjectiveness from what is usually the most difficult aspect of the play, specifically, to determine by replay officials, which is if and when the ball actually crossed the goal line boundary. It is still, however, left up to game/league officials to determine the final ruling on the play.

In one embodiment, the system for detecting an object crossing a plane includes a first transmitter projecting a light plane using a light comprising a light plane wavelength, the light plane defining a boundary, wherein the light plane wavelength is not visible to the human eye, a first receiver for detecting a reflection of light when an object crosses the light plane defining the boundary, the receiver configured to detect light in the range of the electromagnetic spectrum including the light plane wavelength, wherein the receiver includes an image sensor comprising a plurality of sensor pixels, an image processing computer configured to receive an input from the receiver including a recorded frame captured by the receiver, wherein the image processing computer processes the recorded frame for review to identify a frame showing an object crossing the boundary.

In another embodiment, the image processing computer analyzes the processed recorded frame to determine that one or more frame pixels of the recorded frame are saturated, wherein a saturated pixel indicates that a maximum value of the light plane wavelength is detected.

In another embodiment, the image processing computer determines the object has crossed the boundary by comparing the received frame to a baseline frame, wherein the baseline frame does not include an object crossing the boundary.

In some embodiments, the system transmits the processed recorded frame for display for review of the recorded frame to determine that the object has crossed the boundary.

In some implementations, the system further comprises an object configured to reflect light in the light plane wavelength.

In some embodiments, the object is a football.

In some embodiments, the boundary corresponds to one of a goal line of a football field and a sideline of the football field.

In some embodiments, the light plane wavelength is at least one of a Shortwave Infrared (SWIR) wavelength, a Midwave Infrared (MWIR) wavelength, and Longwave Infrared (LWIR) wavelength.

In some embodiments, the image processing computer processes the recording so a raw image appears as a conventional image to allow review for detection of an object crossing the boundary.

In some embodiments, the system further includes a first light source and a second light source positioned on opposite sides of a sports field, wherein the first light source and the second light source are positioned at an elevated location to allow projection of the light plane without interference from an object on the sports field, wherein the object may be one of an equipment and an individual.

In some embodiments, the first light source is positioned at a terrace mounting position on a first side of the field and the second light is positioned at a stadium light mounting position on a second side of the sports field.

In some embodiments, the camera records at one of 24 frames per second (fps), 30 fps, and 60 fps.

In some embodiments, the light plane wavelength is selected to reduce interference from an ambient light.

In some embodiments, the image processing computer combines the input from the camera with a motion picture camera feed for analysis by a game official of a sporting event.

The present disclosure additionally includes a method of detecting an object crossing a boundary, the method comprising calibrating a light source to project a light plane aligned with a line on a sports field, wherein the light plane is formed using light having a light plane wavelength that is outside the visible spectrum, recording a sporting event played on the sports field using a camera configured to record light in the light plane wavelength, wherein the recording includes a plurality of frames depicting sequential images showing occurrences in the sporting event, comparing a first frame of the recording and reference data, and determining an object crossed has the boundary based on the comparison when the first frame shows a substantial reflection of the light plane wavelength in comparison to the reference data, wherein the object is configured to reflect the light plane wavelength of light.

In other implementations, the method further comprises displaying a detection frame of the recording showing substantial reflection of the light plane wavelength with pixels corresponding to the light plane wavelength reflection as saturated pixels or pixels with values significantly higher than the background level. The signal shall be Statistically more significant than the noise (SNR requirement) and also discernable against the background (contrast requirement).

In other implementations, the method further comprises transmitting the recording to a remote location for review of the recording.

In some implementations, the light plane wavelength is at least one of a SWIR wavelength, a MWIR wavelength, and a LWIR wavelength.

BRIEF DESCRIPTION OF THE DRAWINGS

FIG. 2a shows a diagram of a diffuse reflection, according to one embodiment of the present disclosure;

FIG. 2b shows a diagram of a mirror reflection, according to one embodiment of the present disclosure;

FIG. 2c shows a diagram of a mixed reflection, according to one embodiment of the present disclosure;

FIG. 2d shows a diagram of a retroreflection, according to one embodiment of the present disclosure;

FIG. 3 shows a diagram of an object treated with a retroreflector treatment for use with the system of FIG. 1, according to one implementation of the present disclosure;

DETAILED DESCRIPTION

Figure 1:
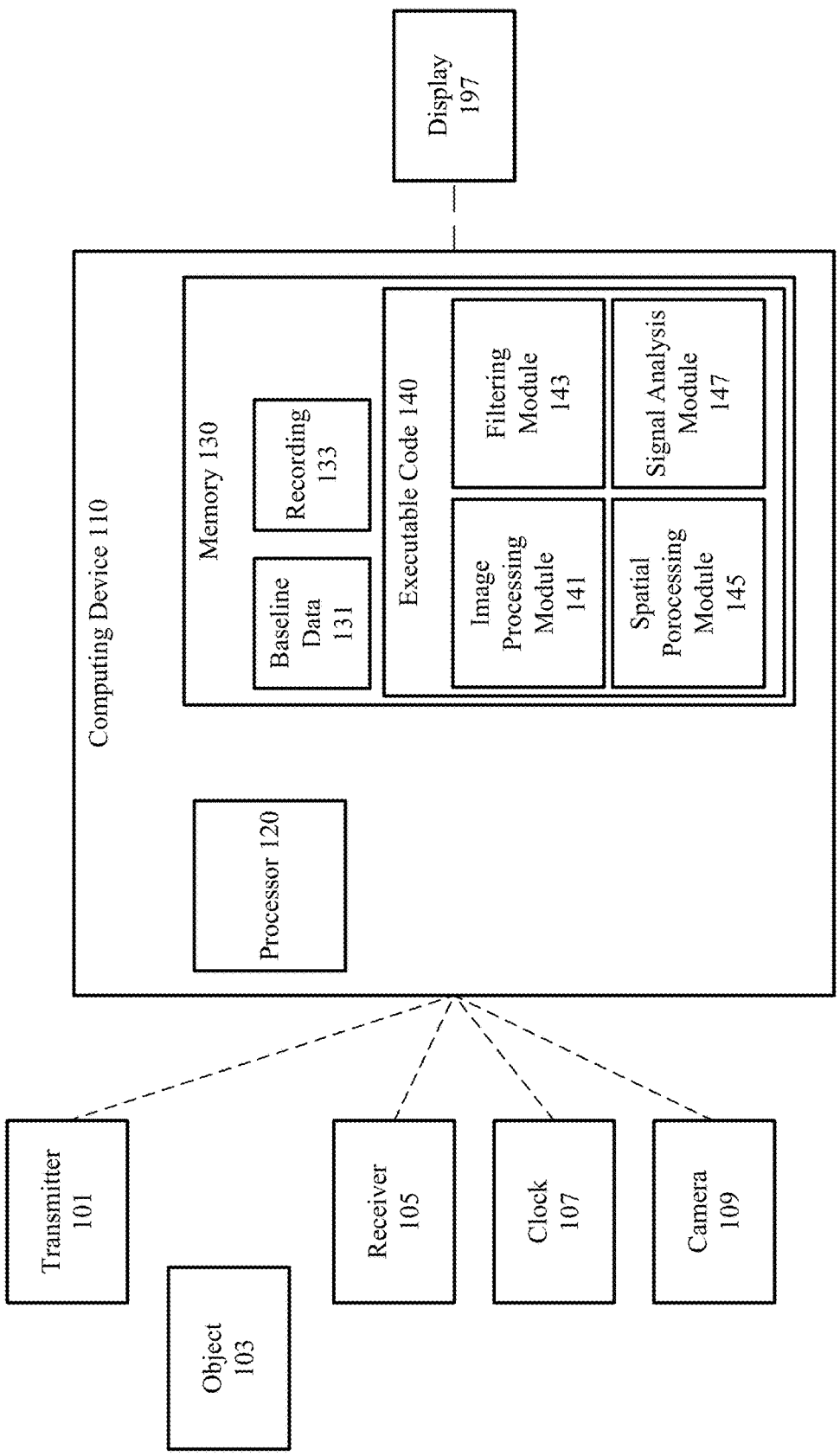
FIG. 1 shows a diagram of an exemplary system for detecting objects crossing planes, according to one embodiment of the present disclosure.

The following description contains specific information pertaining to embodiments and implementations of the present disclosure. The drawings in the present application and their accompanying detailed description are directed to merely exemplary embodiments and implementations. Unless noted otherwise, like or corresponding elements among the figures may be indicated by like or corresponding reference numerals. Moreover, the drawings and illustrations in the present application are generally not to scale and are not intended to correspond to actual relative dimensions.

A system for detecting one or more objects crossing one or more planes. In some embodiments, the system may be used to detect when a football breaks the plane of the goal line in an American Football game. The system is based on lasers, retroreflectors, detectors, and computer systems for image processing.

The system includes a treatment applied to the football to change the reflective qualities of all or portions of the football. The system projects eye-safe lasers to create a plane extending up from and normal to the goal line of a football field. The eye-safe lasers may be a Short-Wave Infrared (SWIR) laser, a Mid-Wave Infrared (MWIR) laser, a Long-Wave Infrared (LWIR) laser, or any combination of SWIR, MWIR, and LWIR lasers. The system may use various technologies to fan and/or scan the lasers across to create the light plane.

The system my include one or more detectors configured to detect reflections of light in the eye-safe laser wavelengths. The detectors may record part or all of a game played on the football field. When game play occurs near the goal line, the system may be used to record events of the game and may be used to determine when and object, such as the football, crosses the plane of the goal line.

The system may include a football that is treated with a retroreflective material. The retroreflective treatment may be optimized to reflect light in the eye-safe laser wavelengths used by the system. When the object crosses the goal line, the retroreflective coating may cause a reflection in the direction of the detectors. The intensity of the retroreflection may cause one or more pixels in an image sensor of the detector to be saturated. A pixel is saturated when it registers a maximum value for one or more colors or wavelengths of light, such as one or more wavelengths of the eye-safe laser used by the system.

In some embodiments, the detectors may include optical filters to effectively differentiate the signal received from the projected lasers upon interaction with the object and the signal received from sunlight and/or other ambient lighting within the spectral response of the detectors. Filtering out the contribution of sunlight, background light, or other ambient light may reduce the necessary power of the laser to create an effective reflection from the ball and/or improve probability of detection while reducing false alarms.

Saturation of the pixels associated with the laser reflection creates a bright flash in the image captured by the detector.

How precisely the detector determines when the football crosses the plane of the goal line may be a function of the sample rate (or frame rate) of the detector. In some implementations, the sample rate may be coordinated with commercial cameras recording the football game for broadcast or replay review, such as a frame rate of 24 frames per second (fps), 30 fps, 60 fps, any frame rate lower, between these values, or higher, whether using a whole number of frames per second or not.

Alternatively, the lack of reflection, if the ball is treated with absorbers, may be used to detect the instant the object(s) crossed the plane(s) because there would be a disproportionate drop in signal in the region of the ball with respect to the surrounding pixels within the remainder of the image.

If the detection system utilizes non-visible wavelengths, a dedicated frame-synchronous visible sensor may also be employed in the system whose viewing perspective is centered on the goal line and thus co-boresighted with the detection system for straightforward fusion of detection events with the visible image sequence. In some implementations, much higher frame rates may be used for high-speed video, and in other implementations, the sample rate of the detectors may be much higher than the frame rate of a video camera for increased temporal resolution.

In some embodiments of the system, the laser(s) may be pulsed (and/or modulated in amplitude and/or frequency) and the detectors synchronized to the outgoing pulses of light so that range (distance) information can be determined from the received signals. Pulsed operation also may allow gating out backscatter in situations in which the environment between the light source and object contains aerosols. Pulsed operation also may allow gating out atmospheric turbulence in situations in which the environment between the light source and object contains significant temperature gradients between the ambient air and the ground.

The detectors may be connected to and/or synchronized with a master clock corresponding to the time of the video recording of the football game. The common-time reference may allow the video of the game to indicate the instant (within the temporal resolution of the system) the football crosses the plane of the goal line in the video feed. The system's signal reduces the factors to be decided by the officials officiating the football game. Having an objective indication of the ball crossing the plane of the goal line allows the officials to then just determine whether the player was otherwise down or out of bounds at the time of the signal.

In other implementations, where a treatment to the football is not required, the system may be calibrated with one or more lasers operating at one or more wavelengths to analyze a reflected light signal and, based on the characteristics of the reflected light, such as intensities (or lack thereof) in certain wavelengths regions, the system may determine that the reflecting or absorbing surface is a football or other specific object or type of object to be detected. The spectral/temporal analysis of the reflected light is used to determine the moment of the football crossing the plane, instead of the reflection from a retroreflector-treatment to the footballs. In some implementations, a different pigment-based surface treatment may be applied to the football to selectively absorb in certain electromagnetic spectral windows.

In some implementations, the system may use real-time or previously recorded information about the position of the football and/or the football players, such as those from the existing radio frequency identification (RFID) devices currently emplaced in game balls and player equipment in NFL football games for detection processing, detection confirmation, and/or false positive filtering. Additionally, the proximity of the football with respect to the end zone could also be used to trigger the system to turn on or off. Moreover, real-time information regarding the approximate location of the football along the lateral extent of the goal line (i.e. along the width of the playing field) may be used to narrow the scanned or fanned extent of the laser field(s) (and possibly the field(s)-of-view of the detector component(s)) to increase signal-to-noise ratio and probability of detection, and decrease probability of false positives.

The system will include real-time signal and/or image processing algorithms for detection of the football crossing the plane of the goal line. In some implementations of the system, machine learning algorithms for signal detection may be employed based on neural networks trained on supervised and/or unsupervised data from real or simulated football game scenarios. Other learning and characterization algorithms may be used for the purpose of pre-game calibration of the system.

FIG. 1 shows a diagram of an exemplary system for detecting objects crossing planes, according to one embodiment of the present disclosure. System 100 includes transmitter 101, object 103, receiver 105, clock 107, camera 109, computing device 110, and display 197. Transmitter 101 may be a laser source for emitting one or more lasers across a boundary or barrier. In some embodiments, transmitter 101 may emit a light source. Transmitter 101 may emit a laser beam. In other embodiments, transmitter 101 may include technology to create a plane or sheet of laser light, forming a plane or partial plane of laser light defining the boundary to be monitored. Technology for spreading the laser emitted by transmitter 101 may include fanning the laser emission, scanning the laser source of transmitter 101 across the boundary, or spinning transmitter 101 to create a plane or partial plane projection. In some embodiments, transmission of transmitter 101 to create a plane or partial plane may use a Powell lens, a cylindrical lens, a diffractive element, a galvanometer scanner, a polygon scanner, a spinning mirror, a Fast-Steering Mirror (FSM), or a Spatial Light Modulator (SLM). In some embodiments, transmitter 101 may use optics to limit the spatial extent of the beam in the direction perpendicular to the goal line.

The wavelength and intensity of the laser emitted by transmitter 101 may impact the use of system 100. For example, some applications may benefit from emission of a visible laser used to create a visible boundary or plane. In other embodiments, a wavelength that is not in the visible spectrum may be more useful. In some implementations, transmitter 101 may emit a laser in a wavelength or range of wavelengths in various portions of the electromagnetic spectrum. Transmitter 101 may be an infrared laser, such as a LWIR laser, a MWIR laser, or a SWIR laser, a Near-Infrared (NIR) laser, a visible spectrum laser, or an ultraviolet laser. Transmitter 101 may emit light of a single wavelength, multiple discrete wavelengths, or span part or of the electromagnetic spectrum.

In some implementations, transmitter 101 may be a spectral supercontinuum laser spanning the electromagnetic spectrum. Transmitter 101 may include one or more transmitters, such as a Fabry-Perot (FP) laser diode, a Broad Area (BA) laser diode, a Single Mode (SM) laser diode, a Distributed Feedback (DFB) laser diode, a Distributed Bragg Reflector (DBR) laser diode, a External Cavity diode laser (ECDL), a Vertical-Cavity-Surface-Emitting-Laser diode (VCSEL), a Master-Oscillator-Power-Amplifier (MOPA) architecture with tapered amplifier (TA) diode, or Fiber-Coupled (FC) versions of any of the above. In some implementations, transmitter 101 may be an array including a combination of one or more of the above transmitters.

In some implementations, use of a SWIR, MWIR, or LWIR laser may enable system 100 to be used in settings benefitting from an invisible laser, such as use in sporting events or other events where visibility and eye safety are important. In some embodiments, transmitter 101 may be an eye-safe laser.

Object 103 may be an object that may cross the boundary illuminated by light plane created by transmitter 101. For example, object 103 may be a ball in a game, such as a football in an American Football game. In some embodiments, object 103 may be treated to reflect the light emitted by transmitter 101. Object 103 may have a retroreflective treatment optimized to reflect light in one or more constituent wavelengths emitted by transmitter 101. In some implementations, object 103 may have a marker or reflective material applied to the outer surface of object 103. The reflective treatment may be applied to all or substantially all of the outer surface of object 103. In other embodiments, the reflective treatment may be applied to a portion of the outer surface of object 103. Object 103 may be treated with a distinctive color or coating, a visible or invisible coating that reflects certain wavelengths of light, or a special reflective coating.

In some embodiments, object 103 may be treated with a reflective material, such as a retroreflective coating for reflecting a detectable portion of incident light in the general direction of the source of the light with minimum diffuse scattering. In other embodiments, the coating may be a material affecting the diffuse scattering and spectral content of the light, such as phosphor. A phosphor may be designed to up-convert the wavelength of the incoming laser light to a shorter wavelength that is detectable by visible cameras and/or the naked eye. The retroreflective coating may comprise spheres, partial spheres, or other geometry formed using particular materials. Use of spherical retroreflective material allows light incident from a large range of angles to be reflected back towards the source of the light, or in a direction of a receiver. Surface treatments to the retroreflective material itself may also be used to enhance the magnitude and/or angular distribution of the scattered/reflected light.

In other embodiments, the surface of object 103 may be treated with one or more other materials, such as micro prisms, optimized prismatic tape, up-conversion phosphors, selective spectral reflectors. Object 103 may be treated with absorbers to affect the reflection of light in one or more wavelengths. In some implementations, an absorber may be a pigment, a dye, or another compound to reduce or change the reflectiveness of object 103 for certain wavelengths of light. In other embodiments, object 103 may be treated with a combination of reflectors and absorbers. The surface treatment of object 103 may be distributed on the surface of object 103 in a way that maximizes the probability of detection of a reflection from the surface treatment. The surface treatments listed above can be implemented individually or used in combination to provide a variety of optical effects.

In some implementations, object 103 may be an American football. The surface treatment may be pressed into cowhide early on in the football manufacturing process. Surface treatment of object 103 may strive for full or partial ball embossment or membrane with integrated material. Other methods for treating the surface of object 103 with a retroreflective treatment may include application of an adhesive, thin film deposition, foil or other embossment, utilization of techniques for emplacing retro-material in pavement markings, vacuum deposition, and packing of the retroreflective material/treatment into seams/laces.

Receiver 105 may be a device for collecting light signals and may be calibrated for detecting light in the spectral range of the light emitted by transmitter 101. In some embodiments, receiver 105 may be a camera, such as a video camera or a digital video camera. Receiver 105 may include a digital sensor for detecting incoming light. Receiver 105 may be connected to a non-transitory computer memory for recording incoming light. Receiver 105 may be calibrated to record incoming light in the visible spectrum, infrared spectrum, such as SWIR light, MWIR light, LWIR light, or other wavelengths of light. In some embodiments, receiver 105 may be configured to saturate the pixels associated with a wavelength emitted by transmitter 101, such as SWIR light, MWIR light, or LWIR light, while the pixels associated with visible wavelength light remain unsaturated. In some implementations, a pixel may be saturated when the pixel of the sensor of receiver 105 records a maximum value for one or more particular wavelengths of light. Saturation of the pixels creates a signal that can be converted into a visual representation clearly marking the moment at which object 103 enters or crosses the boundary illuminated by the light plane formed using transmitter 101.

In some embodiments, receiver 105 may be configured to filter out SWIR light from ambient light sources, such as the sun or electric lighting in a stadium, arena, or other sporting event venue. In some embodiments, filtering may include statistically filtering an incoming signal. The system may record a background level of a particular wavelength or range of wavelengths of light present in the ambient lighting and may require a signal intensity greater than a threshold amount higher than the ambient background level before recording and event. In other embodiments, the filtering may include a physical filter or other digital filtering. In some embodiments, receiver 105 may be positioned at an appropriate elevation relative to the playing field such that receiver 105 will receive a substantial portion of the signal of light from transmitter 101 reflected by the retroreflective coating on object 103.

In some embodiments, receiver 105 may be an Avalanche Photodiode (APD), a photomultiplier tube, an amplified photodetector, a biased photodetector, a photodiode, a photoconductor, a linear pixel array, a time-delay-integration line scanning array, a two-dimensional (2D) pixel array (i.e. image sensor), a spectrometer, a multi-spectral imager, a hyperspectral imager, or any combination thereof. The sample rate and instantaneous field of view of any utilized detector will be determined by the temporal and spatial resolution requirements derived for the system. Similar requirements for spectral resolution and distance resolution would be derived for implementations incorporating hyperspectral or ranging detectors.

In some implementations, receiver 105 may include a polarization filter. Polarization filtering on receiver 105 may be used to reduce the amount of signal originating from ambient light. As most ambient light is randomly polarized in general, placing a linear polarization filter before receiver 105 reduced the ambient signal seen by receiver 105 by approximately 50%. If the axes of the linear polarization filter and the linear polarization of the source are aligned, then the retroreflected signal from transmitter 101, whose polarization is maintained via the complex scattering amplitude from the retroreflective material, will transmit with high efficiency. Birefringent materials can also be used to convert the light emitted by transmitter 101 from linearly polarized to circularly polarized. In this case, a polarization filter array such as Sony PolarSens can be used with the addition of a quarter-wave retarder in the imaging system, which allows one to reduce ambient signal, which rarely has a circular component, seen by the channel associated with the polarization of the laser source by approximately 75%.

Clock 107 is a clock for determining timing of events. In some embodiments, clock 107 may be a master clock, such as a master clock of computing device 110. In other embodiments, clock 107 may be an external clock that is used as a reference time to determine the occurrence of events by comparing a reference time with the time of clock 107. For example, clock 107 may be a game clock of an American football game. The time of the occurrence of an event may be determined by comparing a time of the event with the game clock. The time a laser was emitted may be determined by a clock of transmitter 101 compared to a time of clock 107; the time of a laser detection may be determined by comparing the time of receiver 105 with clock 107. In some implementations, the internal clocks of transmitter 101 and receiver 105 may be synchronized with clock 107. In other implementations, clock 107 may be the master system clock for all components of system 100.

Camera 109 is a camera for recording events, such as sporting events. Camera 109 may be a video camera for recording American football games. In some embodiments, camera 109 may be a video camera recording an American football game. Camera 109 may record at a frame rate of 24 frames per second (fps), 30 fps, 60 fps, 120 fps, or higher. Camera 109 may be a commercial camera. Camera 109 may be a conventional camera or a digital camera. In some embodiments, camera 109 may be a camera recoding the American football game for transmission over a television broadcast, transmission over the internet, or for recording and storing footage of the game.

Computing device 110 is a computing system for use in detecting objects crossing boundaries. As shown in FIG. 1, computing device 110 includes processor 120, and memory 130. Processor 120 is a hardware processor, such as a central processing unit (CPU) found in computing devices. Memory 130 is a non-transitory storage device for storing computer code for execution by processor 120, and also for storing various data and parameters. As shown in FIG. 1, memory 130 includes baseline data 131, recording 133, and executable code 140.

Baseline data 131 may be a database or other information storage file. In some implementations, baseline database 131 may include information about the setting in which system 100 is used. Baseline data may include ranges of detected intensities corresponding to various colors included in a baseline image of a setting, such as on a football field in a pregame setting. Baseline data 131 may include readings of actual intensities from a baseline image captured by system 100 for comparison purposes. Baseline data 131 may include ranges of readings or acceptable intensities associated with the setting in which system 100 is used, wherein the baseline data shows the setting in which object 103 is not crossing light plane projected by transmitter 101.

Recording 133 may be a still image or video recording captured by receiver 105 or camera 109. In some implementations, recording 133 may be a clip recording one or more sequential frames depicting events on a sports field that is recorded by system 100. In some implementations, recording 133 may be part or all of a sporting event, such as an American football game recorded with receiver 105 or camera 109. Recording 133 may be stored, transmitted, broadcast, or streamed. In some implementations, recording 133 may be used to analyze one or more sequences of events that occur during the game being recorded.

Executable code 140 may include one or more software modules for execution by processor 120. As shown in FIG. 1, executable code 140 includes image processing module 141, filtering module 143, spatial processing module 145, and signal analysis module 147. Image processing module 141 is a software module stored in memory 130 for execution by processor 120 to receive input from receiver 105. In some implementations, image processing module 141 may receive input from receiver 105 and process the received signal into an image for display on display 197. Receiver 105 may transmit video data recorded in the visible spectrum during game play. When receiver 105 receives a signal indicating object 103 has crossed the boundary illuminated by transmitter 101, image processing module 141 may combine the signal from the saturated pixels recording the receipt of SWIR light from transmitter 101 reflected by the retroreflectors on object 103 with the video signal recorded and create a composite image showing the video of game play and overlaying the flash created by the SWIR signal. In other implementations, image processing module 141 may combine input from receiver 105 with video input from camera 109 to create the composite video.

Filtering module 143 is a software module stored in memory 130 for execution by processor 120 to calculate a signal strength of recorded wavelengths of light and determine if a recorded signal is significant enough to be considered a recorded event. In some implementations, filtering module 143 may record a baseline intensity of a certain wavelength of light or a range of wavelengths of light. The baseline value may represent the component value of the intensity of the selected wavelengths in ambient light. Filtering module 143 may compare signals recorded by receiver 105 and camera 109 with the baseline value to determine if a received signal includes levels consistent with the ambient light, or if the signal received is above some threshold level for a determined wavelength or range of wavelengths. By recording a baseline SWIR value and comparing the intensity of SWIR recorded by recorder 105 and camera 109, filtering module 143 may determine whether a recorded event included a reflection of transmitter 101 off of object 103.

Spatial processing module 145 is a software module stored in memory 130 for execution by processor 120 to determine the location of an event in space. In some implementations, spatial processing module 145 may receive input from receiver 105 and, based on the received signal, determine a distance between receiver 105 and the recorded event. In some implementations, system 100 may use hyperspectral inputs from receiver 105 to create a one-dimensional or two-dimensional array of spatial locations for determining a location of an event recorded by system 100.

Signal analysis module 147 is a software module stored in memory 130 for execution by processor 120 to analyze the wavelength or wavelengths that make up the composition of signals received by receiver 105 and camera 109. In some implementations, signal analysis module 147 may analyze the spectral components of a signal received from receiver 105 and camera 109. In some implementations, signal analysis module 147 may use a statistical analysis of the received signal to determine if a received signal was reflected off of a surface of a certain material or material type. By analyzing the wavelengths and characteristics of a received signal and comparing the analyzed signal with a database of material-type reflection spectral data, signal analysis model 147 may determine a probability that a received signal was reflected off of a certain material. For example, signal analysis module 147 may receive a signal from receiver 105 or camera 109 and analyze the characteristics of the light received by receiver 105 or camera 109.

Signal analysis module 147 may compare the characteristics with a database of material signals and determine a probability that the received signal matches with one of the materials in the database. Based on this analysis, signal analysis module 147 may determine that object 103 has crossed the boundary of the goal line, and that object 103 is made from cattle hide leather, or other material detected. Based on these conclusions, signal analysis module 147 may determine that the football has crossed the goal line at a certain time, which corresponds to a certain video frame.

Display 197 is a display for viewing content derived by the system. In some embodiments, display 197 may be a television display, a computer display, a mobile telephone display, a tablet computer display, or other technology capable of displaying or conveying images and/or video. Display 197 may be utilized by a referee of a sporting event to view and analyze a replay of events recorded from the event. For example, system 100 may record a play in an American football game in which there is a question regarding whether the player controlling the ball was down before the football crossed the plane of the goal line. A referee of the game may watch a replay of the down to determine whether a touchdown was scored.

FIG. 2 is a diagram showing different reflection possibilities, according to one embodiment of the present disclosure. As shown in FIGS. 2a, 2b, 2c, and 2d, light can be reflected off of a surface in various ways. FIG. 2a shows a diagram of a diffuse reflection, according to one embodiment of the present disclosure. In diffuse reflection form the surface of object 203a, incident light 201a is scattered in a plurality of angles as shown in diffuse reflection of reflected light 204a. In an ideal scenario, diffuse reflection may result in equivalent intensities being reflected in each direction. FIG. 2b shows a diagram of a mirror reflection, according to one embodiment of the present disclosure. Mirror reflection from the surface of object 203b, sometimes referred to as specular reflection, occurs when the angle of incidence of incident light 201b equals the angle of reflection of reflected light 204b.

FIG. 2c shows a diagram of a mixed reflection, according to one embodiment of the present disclosure. Object 203c exhibits mixed reflection in which a significant portion of incident light 201c is reflected with the angle of reflection being at or near the angle of incidence, and other reflections are scattered though many angles of reflection, but with lower intensities, as shown by the mixed reflection of reflected light 204c. FIG. 2d shows a diagram of a retroreflection, according to one embodiment of the present disclosure. As shown in FIG. 2d, the reflection of incident light 201d from the surface of object 203d, substantially all of reflected light 204d is concentrated back towards the source of incident light 201d.

In some cases of retroreflection, the concentrated portion of reflected light 204d, reflected opposite the direction of incidence is produced via geometrical optics and certain arrangements of reflecting surfaces. In other cases of retroreflection, this concentrated portion of light in the direction of incidence is produced via the wave optics phenomenon of Mie scattering. As shown in FIG. 2d, retroreflective object 203d will produce maximum signal return per unit of solid angle in the direction of the laser source, as shown by reflected light 204d.

FIG. 3 shows a diagram of object 303 with retroreflector treatment 321 for use with the system of FIG. 1, according to one implementation of the present disclosure. Diagram 300 shows object 303 is an American football typically used to play the game of American football. Object 303 may be a football of various sizes and may be made from various materials. In some embodiments, object 303 is a professional sized American football, a college sized American football, a high school sized American football, or a youth sized American football. The football may be made from cattle hide leather, other animal skin leather, synthetic leather, or other materials used to construct American footballs.

Object 303 may have reflective coating 321 applied to or embedded in the surface. Retroreflective coating 321 may include an application of retroreflective material applied to part or all of the exterior surface. Retroreflective coating 321 may be barium titanate spheres. In some embodiments, retroreflective coating 321 may be barium spheres with a hemispherical aluminum coating. In other embodiments, retroreflective coating 321 may be barium spheres without a hemispherical aluminum coating. In some embodiments, retroreflective coating 321 may be adhered to the surface of object 303 by an adhesive, such as a glue, or the retroreflective material may be embedded in the exterior surface of object 303. Application methods for securing the retroreflective material to the exterior surface of object 303 may include adhesive bonding, thin-film deposition, embossment, and pressure embedding. As shown in FIG. 3, retroreflective application may be concentrated near the seams or laces of object 303.

In an exemplary implementation, object 303 may be treated with retroreflective coating 321 by the use of a thermal/pressure device with an internal cavity in the shape of object 103. Prefabricated sheets of retroreflective-material-integrated film/foil may be inserted into the cavity to line the cavity walls. Object 303 may be placed in the cavity and the device closed around object 303 and closed. A thermal/pressure control system may apply heat and mechanical pressure to object 303 in an optimized sequence to embed retroreflective coating 321 into the surface of object 303 to an optimized depth, while not altering the physical form of object 303. In some implementations, a device control system returns the temperature and pressure to normal in an optimized sequence to ensure retroreflective coating 321, such as microspheres, remains attached to or embedded in the surface of object 303, while not altering the physical form of object 303. In some embodiments, the thermal/pressure device would be used by a league representative in a pre-game procedure to treat one or more American footballs for use in game play. In other implementations, retroreflective coating 321 may be applied to only or a specific number of "red zone" balls for use when a game play occurs on a particular portion of the field during an American football game, such as when a team is within ten yards of the goal line.

In some embodiments, the treatment method of applying retroreflective coating 321 to surfaces may be a tailored process for depositing microspheres with an optimized size distribution and uniform surface density over the entirety of the ball. Higher concentrations of microspheres could be deposited in specific locations on the ball (i.e., in seams, near laces, within embossed logos, etc.) to increase probability of detection.

The magnitude of the returning signal is a direct function of the number density (a.k.a. "packing fraction") of the material or coating applied to object 303, whether retroreflective, absorptive, or upconverting type of material. In some implementations, these types of materials may affect the original/natural feel of object 303 upon application of the material to the object. Therefore, depending on application and end usage of the system, it may be possible to empirically and/or theoretically search and determine an optimal packing fraction to be used for a particular embodiment that balances signal detection performance with look and feel of the object. In some implementations, the retroreflective coating may be optimized by combining appropriate wavelengths of the light plane light and sphere size to return the maximum signal when object 103 crosses the light plane.

In some implementations, object 303 may be made more detectable by heightening the contrast between object 303 and the background of an image including object 303. By manipulating the spectral reflectance and scatter distributions of object 303 and its background simultaneously, contrast between the two can be significantly enhanced. This can be done by boosting the return signal from the object of interest while simultaneously suppressing the signal from the background such that the signal from the object of interest will dominate all other signals when interacting with the active signal source while the background is characterized by signal significantly smaller than all other signals interacting with the active signal source (i.e. super bright ball on super dark line, all other things interacting with the beam fall in a relatively narrow band between these extremes). The converse can also be done (i.e. super dark ball against super bright line). In either physical polarity, the data could be presented as a real or negative image (i.e., white hot or black hot).

Figure 4:
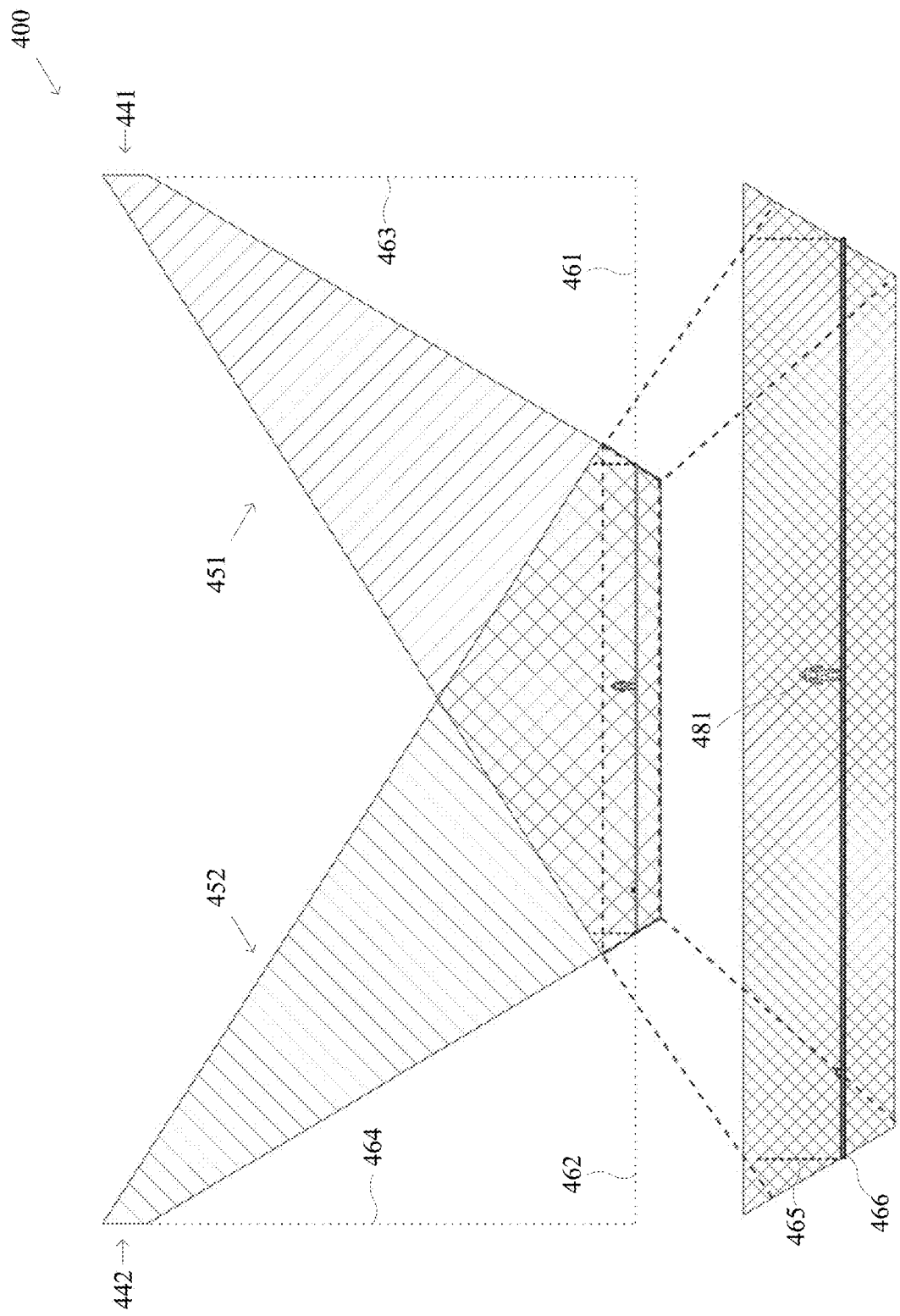
FIG. 4 shows a diagram of laser projection using the system of FIG. 1, according to one embodiment of the present disclosure.

FIG. 4 shows a diagram of laser projection using the system 100, according to one embodiment of the present disclosure. As shown in diagram 400, the system may include more than one laser. In some embodiments, the two lasers may be positioned on opposite sides of a stadium. The lasers may be configured to create a planar projection across the field. The light plane projection can be oriented to align with the plane of the goal line. Proper configuration of the lasers creates a plane that extends across the width of a sports field, such as an American football field and extends to a height greater that the height of a player. As shown in FIG. 4, transmitter 441 projects light plane portion 451, transmitter 442 projects light plane portion 452. Transmitters 441 and 451 are shown positioned with setback 461 and 462, respectively, where the setback is the horizontal distance from the edge of the playing field to the mounting position of the transmitter. Transmitters 441 and 451 are depicted in a mounting position with height 463 and 464, respectively, where the height is the vertical distance from the playing field to the mounting position or the transmitters. The light plane created by the lasers has a height 465 of more than fifteen (15) feet and extends across width 466 spanning the one-hundred-and-sixty (160) foot width of an American football field. For reference, payer 481 is depicted, to scale with the light plane dimensions, is a six-foot-six-inch "player" shown in the middle of the field.

As shown in FIG. 4, the light plane defining the goal line will sufficiently detect an object, such as a football controlled by any player, when it crosses the light plane extending up from the goal line. In some embodiments, projection of the light plane to define the goal line by two or more lasers allows for some portion of the surface of the American football to be illuminated by at least one of the lasers, even when the ball is carried by a player in the game. In other embodiments, there is no minimum height to the laser plane.

In some embodiments, the lasers will be self-calibrating such that they will maintain the intended alignment to the goal plane while taking motion from, but not limited to the following, stadium vibration, incidental contact, displacement of mounting structure, wind vibration/displacement and other natural and manmade phenomena into account. Such self-calibrating processes may use one or more reference datums or fiducials located on or near the goal line to accomplish the desired alignment with respect to the goal line plane. The system could be self-calibrating on start up as well as self-calibrating during operation.

Figure 5:
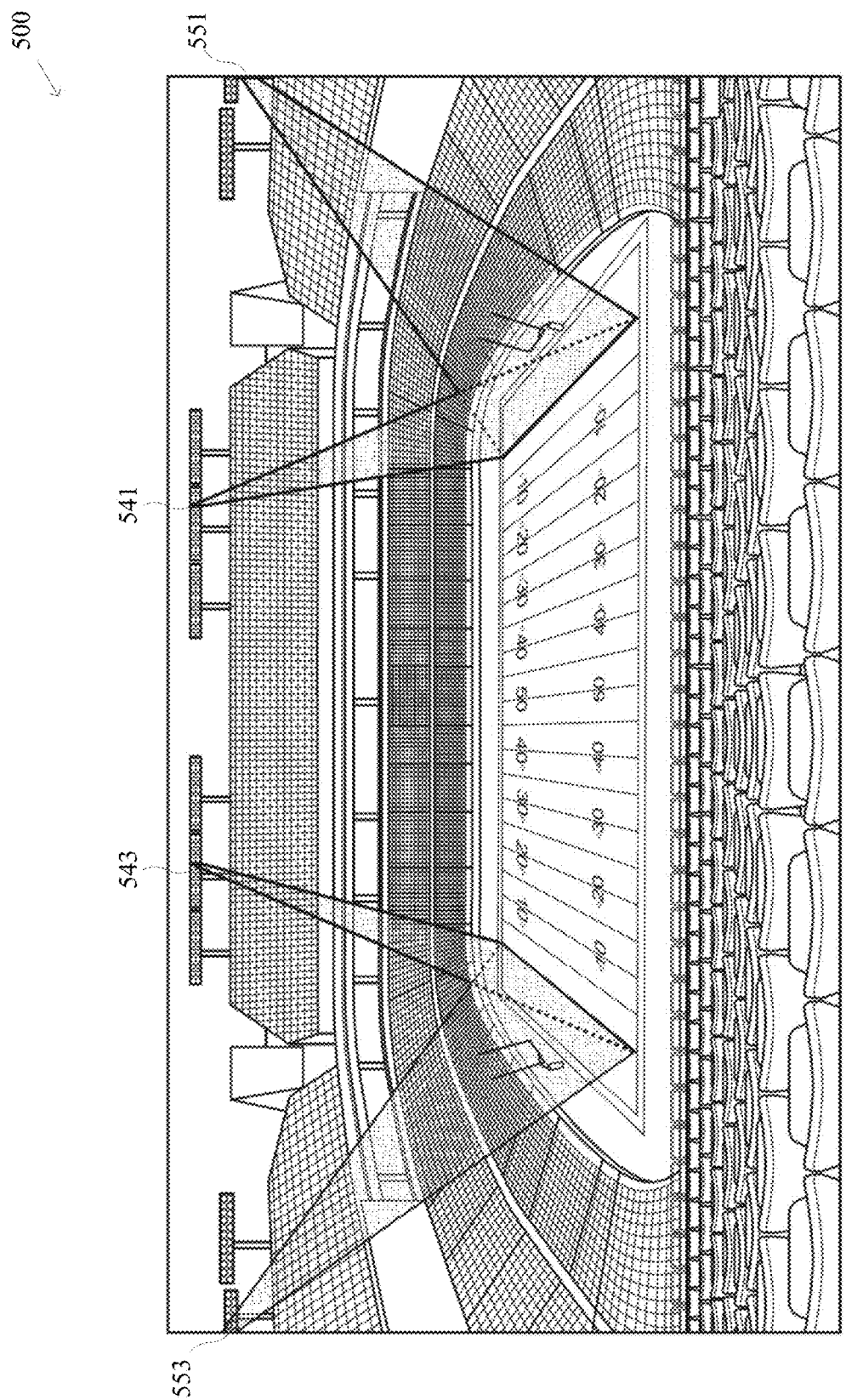
FIG. 5 shows a diagram of an exemplary sports stadium implementing the system of FIG. 1, according to one embodiment of the present disclosure.

FIG. 5 shows a diagram of an exemplary sports stadium implementing the system of FIG. 1, according to one embodiment of the present disclosure. Diagram 500 shows an embodiment of system 100 having lasers mounted on either side of a football stadium creating the light plane extending up from the goal line. The light plane may be projected using light that is invisible to the human eye and to commercial television cameras. Additionally, positioning of the lasers far from the field and high above the field is sufficient to ensure that the lasers will not be blocked by people or equipment, such as players and coaching staff moving about on the sideline of the field, camera equipment, broadcasting equipment, or other incidental obstructions that may block a laser if it were positioned at a lower level.

As shown in FIG. 5, the light sources may be positioned in the light fixtures to create an angle so that the overlapping light planes sufficiently cover the plane extending up from the line on the field, such as the goal line. Selection of a proper light source is important to ensure that the intensity of the light is great enough to be effective at the field level. Transmitters 541 and 551 are depicted on opposite sides of the field projecting the light plane across the goal line at one end of the football field. Transmitters 543 and 553 are depicted on opposite sides of the field projecting the light plane across the goal line at the opposite end of the football field. As shown in FIG. 5, transmitters 541, 551, 543, and 553 are mounted at a stadium light level. In other embodiments, one or more laser(s) and one or more detector(s) would be embedded in the goal line pointed in the upwards direction.

Figure 6:
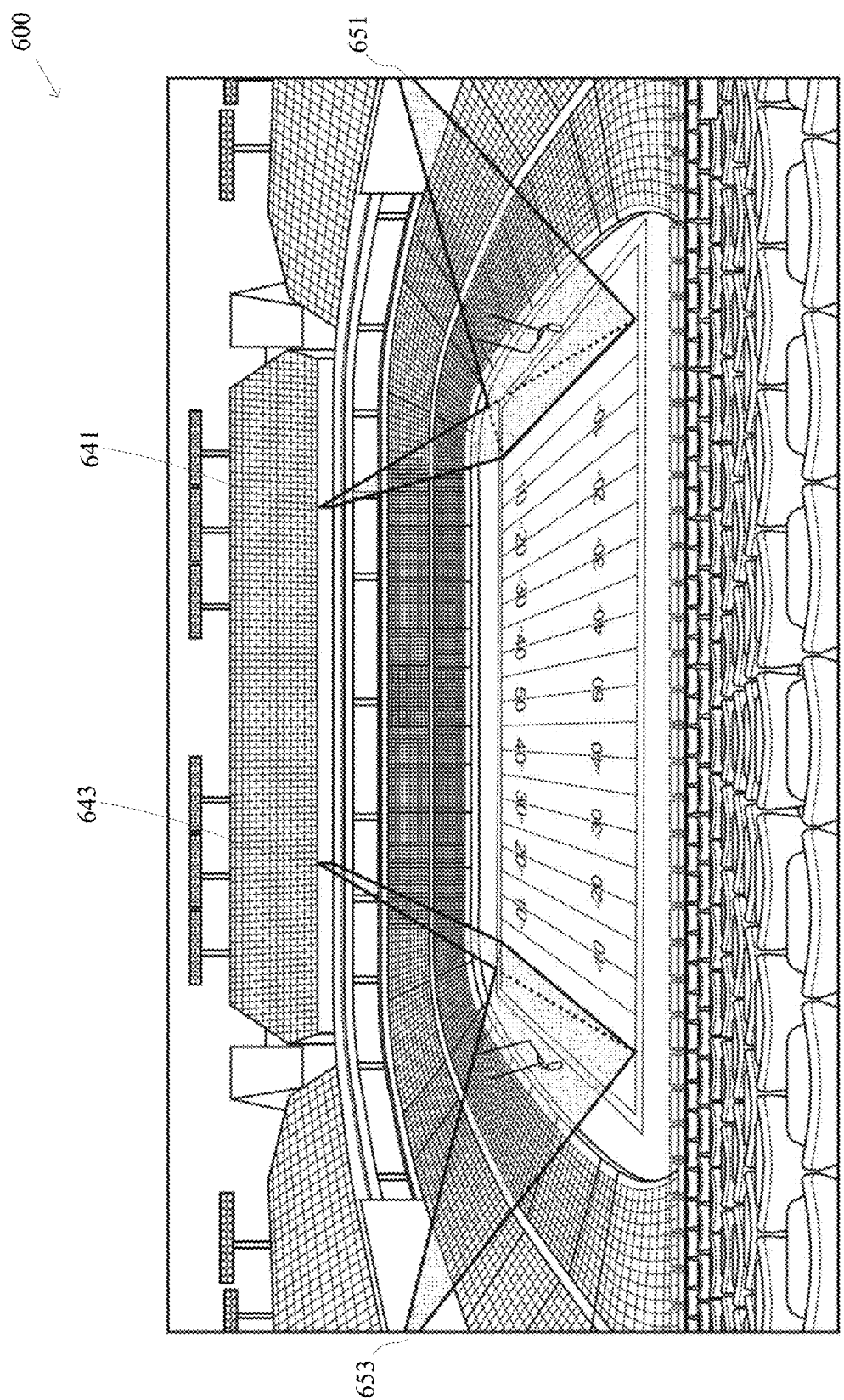
FIG. 6 shows a diagram of another exemplary sports stadium implementing the system of FIG. 1, according to one embodiment of the present disclosure.

FIG. 6 shows a diagram of another exemplary sports stadium implementing the system of FIG. 1, according to one embodiment of the present disclosure. Diagram 600 shows an embodiment of system 100 having lasers mounted on either side of a football stadium creating the goal line plane. By using SWIR lasers, MWIR lasers, or LWIR lasers, system 100 may create a light plane defining a boundary that is invisible to the human eye and to commercial television cameras. Additionally, positioning of the lasers set back from the field and elevated above the field may be sufficient to ensure that the lasers will not be blocked by people or equipment, such as players and coaching staff moving about on the sideline of the field, camera equipment, broadcasting equipment, or other incidental obstructions that may block a laser if it were positioned at a lower level.

As shown in FIG. 6, the light sources may be positioned in the light fixtures to create an angle so that the overlapping light planes sufficiently cover the plane extending up from the line on the field, such as the goal line. Selection of a proper light source is important to ensure that the intensity of the light is great enough to be effective at the field level. Transmitters 641 and 651 are depicted on opposite sides of the field projecting the light plane across the goal line at one end of the football field. Transmitters 643 and 653 are depicted on opposite sides of the field projecting the light plane across the goal line at the opposite end of the football field. As shown in FIG. 6, transmitters 641, 651, 643, and 653 are mounted at a terrace level. In some implementations, system 100 may include a combination of transmitter mounted at different positions, such as an implementation with complimentary transmitter pairs having one at a stadium lighting level and the second mounted at the terrace level.

Figure 7:
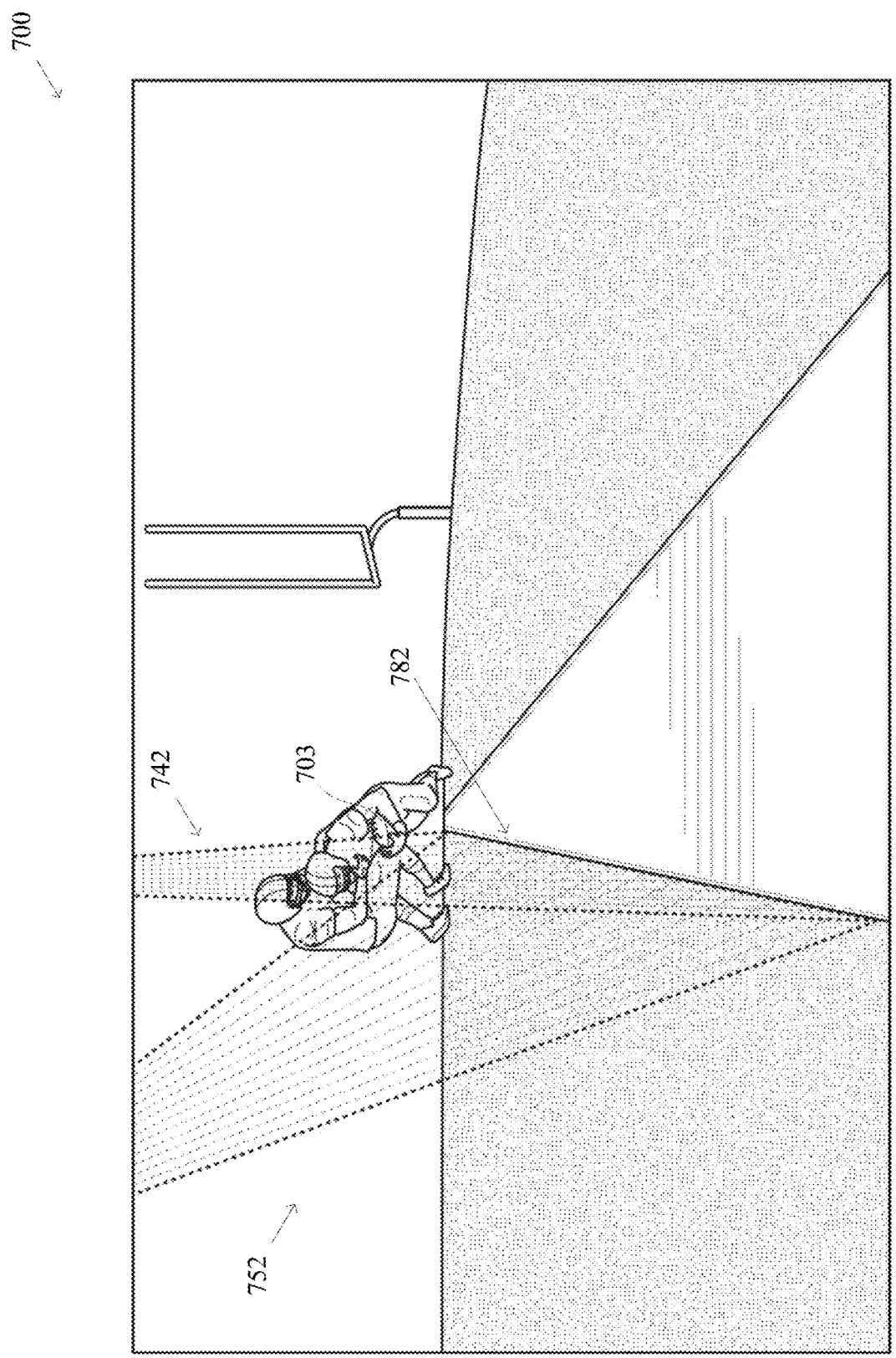
FIG. 7 shows a detail view of a boundary plane laser projection using the system of FIG. 1, according to one embodiment of the present disclosure.

FIG. 7 shows a detail view of a boundary plane laser projection using the system of FIG. 1, according to one embodiment of the present disclosure. Diagram 700 shows the projection of the light plane of the goal line created by transmitter 101 at field level. By using lasers, the light plane can be precisely calibrated for proper orientation before the beginning of play. In some implementations, transmitter 101 may be occasionally or periodically calibrated during the course of a game to ensure consistency. In other implementations, system 100 may self-calibrate and not require human intervention to calibrate or reorient. As shown in FIG. 7, the light plane projected at the goal line is not shown to scale, but demonstrates the light plane is coincidental with the edge of the goal line closest to the playing field of the game.

Figure 8A:
FIG. 8a shows a collection of images detailing the use of the system of FIG. 1, according to one embodiment of the present disclosure.

FIG. 8a shows an exemplary collection of images detailing the use of the system of FIG. 1, according to one embodiment of the present disclosure. As shown in diagram 800a, the upper row of images represents the raw image frame captured by receiver 105. Frame 801a depicts a first time showing an individual carrying a ball before the ball crosses the goal line. Frame 802a depicts a second time after the first time showing the individual carrying the ball at the moment the ball crosses the goal line. The lower row of images shows the corresponding images after modifying the contrast of the image to provide more contextual information. As can be seen in the images, frame 801b shows the captures image prior to the ball crossing the plane of the goal line. As shown in frame 802b, the ball crossing the plane of the goal line results in a bright flash due to the saturation of the pixels receiving the light plane wavelength.

In some implementations, the sequences of images leading up to and including frames shown in FIG. 8a will allow a referee on the field to progress through the frames of a replay and determine when the ball crosses the goal line. The precision of the determination is governed by the frame or sample rates at which data is collected by receiver 105 and camera 109. Once the referee has determined that the ball crossed the plane of the goal line in the second image, consideration of whether a touchdown has been scored is reduced to determining if the player was down or out of bounds before the time at which the ball was determined to have crossed into the end zone by the system.

Figure 8B:
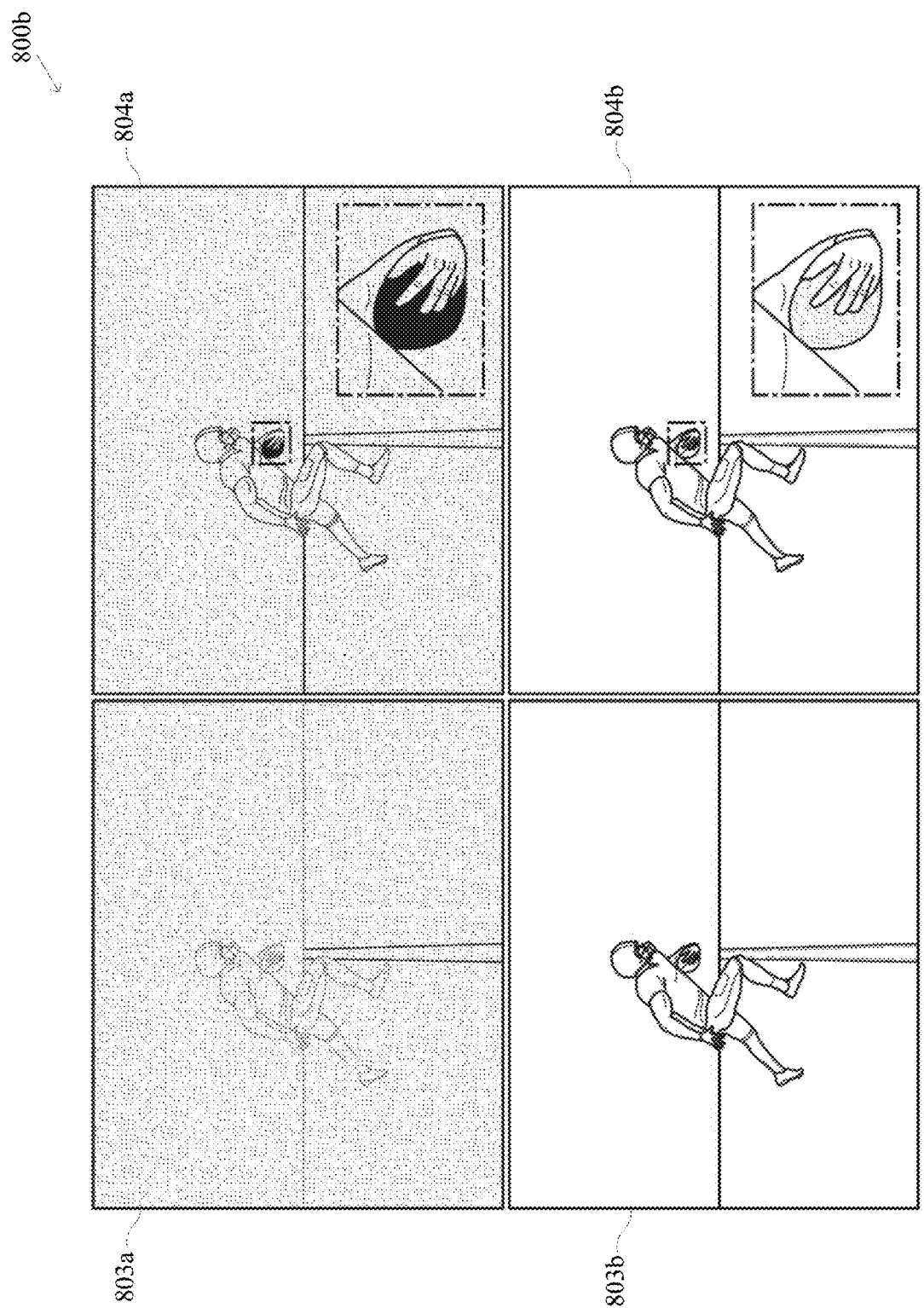
FIG. 8b shows a diagram depicting use of the system of FIG. 1 in an American football game, according to one embodiment of the present disclosure.

FIG. 8b shows a collection of images detailing the use of the system of FIG. 1, according to one embodiment of the present disclosure. As shown in diagram 800b, the upper row of images represents the raw image frame captured by receiver 105 at a first time (before the ball crosses the goal line) and at a second time (the frame when the ball crosses the goal line). The lower row of images shows the corresponding images after modifying the contrast of the image to provide more contextual information. As can be seen in the images, the ball crossing the plane of the goal line creates a bright flash. The sequences of images leading up to and including these two frames will allow a referee on the field to progress through the frames of a replay and determine when the ball crosses the goal line. The precision of the determination is governed by the frame or sample rates at which data is collected by receiver 105 and camera 109. Once the referee has determined that the ball crossed the plane of the goal line in the second image, consideration of whether a touchdown has been scored is reduced to determining if the player was down or out of bounds before the time at which the ball was determined to have crossed into the end zone by the system.

Determination of the ball-crossing event provides a great deal of objectivity to when a touchdown is scored. The subjective opinion of when an individual is down, separated from whether the individual is down before the touchdown is scored, is a significantly reduced burden on game officials and will add a great deal of certainty to rulings on reviewed plays.

Figure 9:
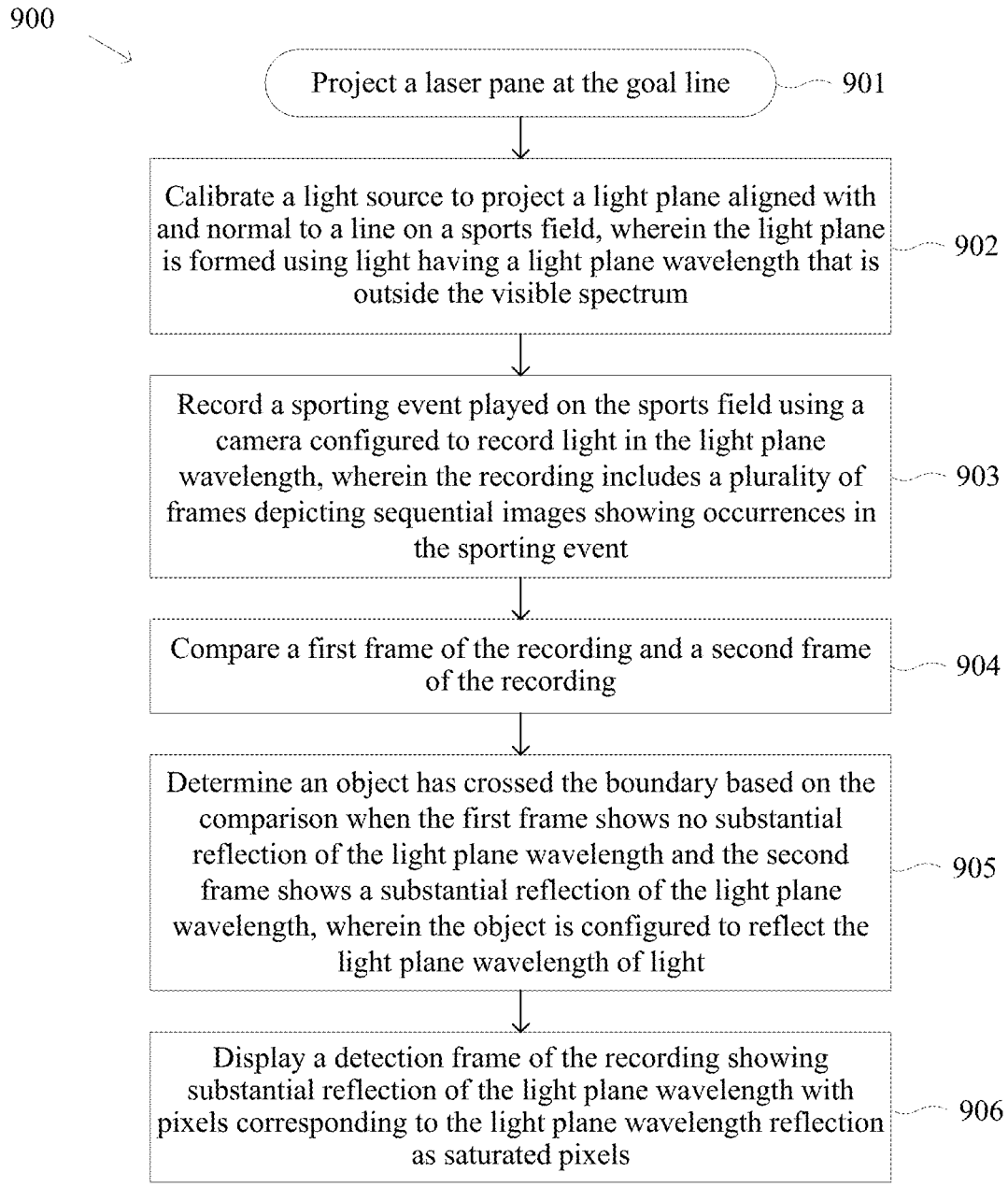
FIG. 9 shows a flowchart of a method of detecting an object crossing a boundary plane, according to one implementation of the present disclosure.

FIG. 9 shows a diagram of another exemplary system detecting objects crossing planes, according to one implementation of the present disclosure. Flowchart 900 shows the steps of a process for determining an object has crossed a plane. At 901, transmitter 101 projects a light plane defining a boundary on a sports field. The light plane is created by fanning or otherwise spreading light emitted by transmitter 101 to form a plane. In some embodiments, the system may use one or more lights to create the plane defining the boundary to be crossed.

Transmitter 101 may include a SWIR laser, a MWIR laser, a LWIR laser, a combination of infrared (IR) lasers. The light plane may be projected in a light plane wavelength. In some implementations, the light plane wavelength may be a single wavelength, or a light comprised of multiple wavelengths of light. The light plane may be projected using a wavelength or combination of wavelengths that are not visible to the unaided human eye.

At 902, system 100 is calibrated so that the light plane is aligned with and normal to a line on a sports field, wherein the light plane is formed using light having a light plane wavelength that is outside the visible spectrum. In some implementations, the light plane may be substantially two-dimensional, spanning at least the width of the sports filed and having a height sufficient to detect an object that is part of the game played on the sports field when it crosses the plane during ordinary game play. In such an implementation, the substantially two-dimensional light plane may have a negligible depth or no depth. A sufficient height may differ depending on the game played on the sports field.

To detect a football crossing the goal line during an American football game, the height of the light plane may be about six feet tall, about eight feet tall, about ten feet tall, or any height in between these heights. In other implementations, the light plane may begin at a height off the ground and extend upwards, such as a light plane put in place above and co-planar with a net in a netted sport, such as tennis, badminton, or volleyball. In other implementations, the light plane may have a width, height and a depth and extend through a volume of space. In some implementations, a light plane with a depth may increase the probability of detecting an object crossing the boundary in a crowded environment.

In some embodiments, looking down the goal line from a laterally offset and elevated position, the transceivers could be aligned in translation/pitch/roll/yaw such that the edge of the fanned/scanned laser beam forms the light plane that is coincident with the front of the goal line across the full length of the goal line of an American football field, and the relative alignment between the laser and the detector(s) is such that the vertically extending laser line falls in the center of the horizontal field of view receiver 105.

In some embodiments, system 100 may use high speed output for low latency signaling of detections to external systems via standardized communication protocols (wired and/or wireless). In some embodiments, system 100, and use thereof, may include built-in tests, such as 1) Periodic Built-In Test (PBIT): Periodic alignment check after quarters with physical alignment datum on front of goal line; and 2) Initiated Built-In Test (IBIT): Initiated alignment check based on location of fiducials in image after initial alignment. The Goal Plane Reference Frame (GPRF) may be defined as the leading edge of the goal line (in the field direction) spanning from the near sideline to the far sideline (y-axis) with origin chosen to be on the near side closest to the transceiver. The vertical axis (z-axis) is then a vector that shares origin with the z-axis that is both normal to the field and orthogonal to the y-axis. The x-axis is then the cross product of y and z axes and hence share origin with bot z-axis and y-axis, and is orthogonal to both, and in the direction of the field.

To ensure the laser light plane is accurately and reliably co-aligned within the GPRF, and only creates a light plane that accurately represents the goal plane, the transceiver unit may be integrated with a device with attributes that provide 6 (six) degrees of freedom: 3 (three) degrees for angular adjustment and 3 (three) degrees for linear translation. (i.e., pan, tilt, roll in angle space and up, down, right/left in linear space).

One embodiment may be realized using a 3-axis gimbal or ball socket, either of which can be mounted on a linear stage with adjustable left/right and height.

LOS calibration (co-alignment) is the act of setting up the system before and/or during a game that performs this alignment process and can be accomplished manually or preferably automatically by use of a closed-loop control system with feedback to the processing computer. One embodiment may be realized by a series of retroreflectors temporarily placed at specific locations along the goal line (y-axis) to ensure the laser line aligns with the goal line axis. Likewise, a series or retroreflectors can be placed in the z-axis at the origin spanning up as high as necessary to ensure the light plane is simultaneously aligned with the z-axis. Pan, roll, tilt, and x-axis translation adjustments are made appropriately to align the light plane to these axes. Transmitter laser divergence can be temporarily expanded to help with the initial GPRF alignments and then reset and finely adjusted to ensure the laser spans fully sideline to sideline, but not more than sideline to sideline.

At 903, system 100 records a sporting event played on the sports field using a camera configured to record light in the light plane wavelength, wherein the recording includes a plurality of frames depicting sequential images showing occurrences in the sporting event. In some implementations, system 100 may record a game using receiver 105, camera 109, or a combination of receiver 105 and camera 109. The recording may be a detection recording for detecting object 103 crossing the boundary. In some implementations, receiver 105 and camera 109 may be co-located to record the events at the light plane created by transmitter 101. In some embodiments, transmitter 101 and receiver 105 may be co-located to increase the probability of detection due to the inherent nature of Mie-scattering of light and the fact that it is concentrated in the return direction, approximately 180 degrees from the incident light. In some implementations, system 100 may store the recording of the game in memory 130. In some implementations, system 100 may transmit the recording for storage, streaming, broadcasting, or other form of distribution.

At 904, receiver 105 receives a signal indicating that object 103 has crossed the light plane. In some implementations, object 103 may be an American football and the light plane may be the plane of the goal line on a football field. The plane of the goal line is the two-dimensional plane extending up from and normal to the American football field. In some implementations, object 103 is treated with a retroreflective treatment optimized to reflect the light plane wavelength of light. When retroreflective object 103 crosses the light plane, the retroreflective treatment causes a significant reflection of the light plane wavelength to return in the direction of transmitter 101. The retroreflection is received by receiver 105.

In some implementations, the signal received maximizes the signal recorded by one or more pixels in an image sensor in receiver 105. When a pixel of the image sensor records a maximum value of one or more wavelengths, that pixel is saturated. In some implementations, each pixel may be sensitive to one or more wavelengths of light. The image sensor may be sensitive to a range of light including the IP wavelength or wavelengths making up the light plane. The image sensor may be sensitive to a range of light including the IP wavelength or wavelengths making up the light plane wavelength.

At 905, system 100 compares a first frame of the recording and a reference data. In some implementations, the reference may be a second frame of the recording in which no object is crossing the light plane projected by transmitter 101. In some implementations, the reference may be a baseline data set. The baseline data set my be generated by calibration before the beginning of the game and stored in memory 130.

In some implementations, executable code 140 may analyze the signals from receiver 105 and camera 109 to determine that object 103 has crossed the light plane. Executable code 140 may compare a frame received from receiver 105 and analyze the image to determine whether object 103 the frame depicts object 103 crossing the light plane. In some implementations, executable code may compare the values corresponding to one or more pixels in the recorded frame image to a set of baseline values. The baseline values may correspond to an image in which object 103 is not crossing the light plane. In some implementations, the baseline values may be based on an image of the boundary, such as the goal line, captured but depicting object 103. In some implementations, the baseline values may include ranges of colors, intensities, or saturations expected when an image does not include a retroreflection of the light plane wavelength. In some implementations, the baseline image or baseline values do not include any saturated pixels. In other implementations, the baseline image or baseline values do not include any pixels calibrated to record the light plane wavelength that are saturated At 906, determine an object has crossed the boundary based on the comparison when the first frame shows no substantial reflection of the light plane wavelength and reference. In some implementations, the reference data may be a frame immediately preceding the analyzed frame in the game. System 100 may determine that object 103 has crossed the plane when the first frame shows a substantial reflection of the light plane wavelength, wherein the object is configured to reflect the light plane wavelength of light. System 100 may compare the first frame to the reference data or a second frame to determine the presence of a substantial reflection in the light plane wavelength.

Executable code 140 may determine that the recorded frame depicts object 103 crossing the light plane of the boundary when one or more pixels of the image, sensitive to the light plane wavelength, is saturated. The saturated pixel or pixels indicate that the recorded frame depicts object 103 crossing the light plane. When a consecutive sequence of recorded frames each include images depicting object 103 crossing the light plane, the first of the consecutive images shows the initial crossing of object 103 across or through the light plane. In some implementations, system 100 may determine the first frame depicting object 103 crossing the boundary and transmit that frame image for review by a game officiant. In some implementations, system 100 may transmit one or more consecutive recorded frames occurring sequentially before or after the first frame depicting object 103 crossing the boundary for comparison with the first frame depicting object 103 crossing the boundary.

Based on the expected signal return from object 103 upon interaction with the light plane, the exposure time of receiver 105 or camera 109 may be dynamically tuned by an algorithm using real-time measured returns from the pixels sampling the laser-plus-ambient illuminated goal line and the pixels in the adjacent regions sampling ambient illumination only on unpainted turf. Exposure time, up to the maximum consistent with the desired frame rate, and digital gain would be adjusted to maintain a target signal level in these regions such that the presence of the ball would then raise the signal level of the pixels sampling the ball to a level approaching or above the saturation point of the digital count range.

In some implementations, executable code 140 may create a composite of the images for viewing on display 197 for game officials to determine whether a touchdown was scored when the ball crossed the goal line, or if the player was down or out-of-bounds first and no touchdown occurred.

Super-Resolution

One of the primary contributors to achieving fine spatial resolution is Ground Sample Distance (GSD) which is essentially the spatial projection of a detector pixel through the detector optical system onto the object being imaged. Therefore, the spatial resolution is fundamentally limited to the GSD of the detector. In 2-D and 1-D imaging cameras, these pixels are arranged in arrays or lines and are in general, fixed with respect to one another. However, a plurality of 2-D or 1-D arrays can be implemented for a single goal plane to allow spatial overlap between receivers. The overlap structure can be tuned to allow neighboring receivers to spatially oversample the goal line, thereby enabling finer spatial resolution.

Superresolution can be achieved also with a single receiver equipped with fast steering mirror assembly that rapidly provides a fraction of a pixel angular excursions in a sinusoidal fashion between frames such that each frame represents a slightly different angle with respect to each other, which effectively manifests as superresolution. The pro of this method allows less transceivers. However, one potential drawback may be a reduction in the effective temporal resolution of system 100.

It is further considered that system 100 may be used for various other scenarios in which the football breaking a plane may be useful. For example, the system could be used to detect other aspects of the game including first downs or the distance the ball has travelled for onside kicks. A system configured on tracks integrated into the stadium infrastructure could be used for these purposes. As an alternative to a tracked system, a team of drones outfitted with transceivers could be used which would negate the need for a major stadium integration effort. For example, a number of drones may span the width of the field establishing multiple lines of sight and redundancy that can move with the first down markers.

Specialized autonomous flight control algorithms would be implemented to maintain precise orientations of the drones with respect to each other, as well as with respect to the physical boundary being monitored. An integrated inertial measurement system integrated into each drone's control loop would be used to ensure the transceiver is oriented to look straight down to produce a detection plane that is orthogonal to the plane of the playing surface. Additional applications may include detection of out-of-bounds events (e.g., at sidelines and sides/back of end zones) by applying retroreflective material to the cleats or other surfaces of clothing and equipment worn by players. In some embodiments, this may require including a non-retroreflective modality for football relative to goal line boundary detection (i.e., spectrally based) to avoid creating a plurality of meaningful signals between the ball and players' cleats.

In some embodiments, system 100 may include two or more transceivers at each end zone, or at each location a plane may be projected on the field to increase probability of detection and reduction of false alarms. Monte Carlo simulations could be used to determine the optimal number of transceivers and the field-of-view associated with each to satisfy a given probability of detection for a boundary crossing event in the presence of dynamic obstructions (i.e., time-dependent player movement and ball visibility to lasers/detectors).

In some embodiments, a physics-based video game engine may be employed for simulation and system configuration/geometry optimization. Machine Learning, Deep Learning, and Artificial Intelligence techniques may be used for optimization.

In some embodiments, the system may work by flood illumination of a stadium with incoherent broadband SWIR light and integration of hyperspectral imagers throughout the stadium. System 100 may be capable of multi-tracking of spectrally identified objects (football, players, officials, first down markers, etc.) over the entire field. In some implementations, various boundaries, such as sidelines and goal lines, may be highlighted by planes of increased intensity light, such as coherent SWIR light planes projected on the appropriate boundary. Thus, the system would be able to track objects in the field that reflect light in the SWIR wavelength or wavelengths used by system 100, and still receive high-intensity input when object 103 crosses a monitored boundary.

PREFERRED EMBODIMENT

One embodiment of the present disclosure consists of a laser source with center wavelength of 1230 nm and 3 nm full width at half maximum (FWHM) spectral width, a camera with an indium gallium arsenide (InGaAs) sensor having 1280×1024 resolution and 10 micrometer pixels, an F/2.25 optical system with focal length of 100 mm, and a 25 nm bandpass filter centered at 1230 nm. In cloudless rural midday conditions, it was determined that 2.5 mW/cm2 of optical power density from the laser source at a range of 86 m was sufficient to detect footballs treated with a range of microsphere surface densities in the presence of grass and artificial turf, painted white stripes on grass and artificial turf, football jersey numbers, various clothing materials, and human skin. The measured data from this demonstrated embodiment allows for analysis of the system over a variety of trade parameters to deduce an optimized system with respect to key performance parameters and measures of effectiveness pertaining to positive detection of the ball in the presence of relevant clutter and ambient lighting conditions.

A preferred embodiment of the invention for detecting a football crossing a goal line in an American football game consists of the following:

Geometry

At least two transceivers independently establishing and monitoring the laser plane denoting the goal line boundary from opposite sides (from a field width perspective) of each end zone. At least two transceivers situated at terrace level of a typical NFL stadium on opposite sides of each end zone at a height above ground level of approximately 80 feet and a lateral sideline offset of approximately 195 feet.

Each transceiver transmits a continuous wave laser sheet with fan angle of approximately 12 degrees at a depression angle (i.e., with respect to the horizon) of approximately 16 degrees. This allows the laser sheet from each transceiver to cover the entirety of the relevant 160 ft end zone boundary up to a height above ground of 15 feet from pylon to pylon with dual redundancy in each end zone.

Active Signal Source—Laser

The preferred embodiment utilizes a laser with continuous output at 1400 nm center wavelength, with laser power of approximately 3 Watts (W) at 3 nm FWHM spectral width, or approximately 0.7 W for a spectrally narrowed and stabilized design at 0.3 nm spectral width. Over the spatial profile of the beam at field level, resulting eye-safety margins are approximately 2400× and 14000×, respectively.

Transmitter

The laser output from each transceiver is conditioned into a fanned continuous wave beam. Fanning provides simultaneous coverage of the entire boundary on every detector sample, versus an un-fanned beam that is scanned at high frequency and has an associated revisit rate. Each beam is fanned in the elevation axis (i.e., about the pitch axis with respect to the horizon) to approximately 12 degrees at $1/e^2$ of the peak intensity (full angle).

Each beam is collimated in the azimuth axis (i.e., about the yaw axis with respect to the horizon) to approximately 1 mrad at 1/e2 of the peak intensity (full angle). An optional second continuous wave laser source, with 1/e2 divergence of approximately 200 microradians, power of <100 mW, and spectral and polarization properties similar to that of the first fanned laser source, may be employed in each transmitter and scanned via a 1-axis galvanometer mirror over approximately 12 degrees at a scan rate of up to 5 kHz. The second scanned laser source is oriented such that the scanned output sheet is coaligned with the fanned output sheet from the first laser source. The purpose of the optional scanned laser source is to provide enhanced spatial precision along the goal line, as well as to provide an InGaAs avalanche photodiode (APD), whose sample rate, bandwidth, and sensitivity are higher than that of an InGaAs focal plane array, with a fast temporal signal to detect as the scanned beam interacts with the ball.

Receiver—Imager

The receiver used in the preferred embodiment provides spatially resolved detection integrated over video frame rate and detects location of ball boundary crossing along boundary line at sample rates on the order of 60 Hz. The receiver used in the preferred embodiment is an F/1.4 optical system with focal length of approximately 60 mm. The receiver used in the preferred embodiment includes an InGaAs focal plane array with 1280×1024 10 micrometer pixels acquiring image frames at greater than or equal to 60 frames per second.

The receiver used in the preferred embodiment includes an optical bandpass filter whose spectral transmission band is centered, and nominally matched to, the full-width-at-half-maximum (FWHM) spectral output of the laser sheet wavelength. The receiver used in the preferred embodiment includes a linear polarization filter whose axis is aligned to maximally transmit the polarization of the laser sheet.

Receiver—InGaAs Avalanche Photodiode (APD)

The receiver used in the preferred embodiment utilizes an InGaAs sensor to provide temporally resolved detection integrated over spatial extent of boundary. The sensor Detects the ball-boundary crossing anywhere along boundary line at sample rates on the order of 10 kHz (i.e., sampling every 100 microseconds) with no spatial resolution. An afocal imaging system is used to collect light from the scene and then focus onto the active area of the InGaAs APD. The sensor provides the same optical filtering (bandpass+linear polarizer) as an imager.

The preferred embodiment includes a high-resolution Si focal plane array (i.e., normal color imager). The preferred embodiment is oriented to view the same perspective directly along boundary as InGaAs imager and APD. The receiver may be synchronized to other detectors in time.

Taggant

In a preferred embodiment, the system includes a football treated with a retroreflective material. The retroreflective material includes microspheres having a 1.9 refractive index with a mean microsphere radius of 20 micrometers and approximately 6% mean sphere surface density over the surface of the football to be detected. The microspheres may be optionally hemispherically coated with an aluminum shell to improve the reflectivity. In some implementations, the football may include one or more regions of higher concentration density of taggant, such as in or near the ball seams, on or around the laces, in the embossed team or league logos or markings.

Hemispherically Al-coated microspheres provide approximately 5× signal increase from laser return to detector(s) over uncoated microspheres at a given surface density. A mixture of Al-coated and uncoated spheres with similar radii could also be employed resulting in an effective signal increase of up to 5× as a function of the ratios of Al-coated to uncoated spheres distributed uniformly over the surface of the ball Channel Urban aerosol distribution, 5 km meteorological visibility, which is typical for radiometric simulations in urban environments where football stadiums are generally located Background Uniform and continuous matte acrylic white paint (i.e., the actual painted goal line of each endzone)

Ambient Signal

Terrestrial solar, 5280 ft elevation above mean sea level, 250th day of year, 1:00 pm local time (worst-case in terms of regular season and playoff games)

Auto Exposure Algorithm

Based on the expected signal return from the ball upon interaction with the laser sheet, the InGaAs camera's exposure time can be dynamically tuned by an algorithm using real-time measured returns from the pixels sampling the laser-plus-ambient illuminated goal line and the pixels in the adjacent regions sampling ambient illumination only on unpainted turf.

Exposure time, up to the maximum consistent with the desired frame rate, and digital gain would be adjusted to maintain a target signal level in these regions such that the presence of the ball would then raise the signal level of the pixels sampling the ball to a level approaching or above the saturation point of the digital count range.

In some implementations, components of system 100 may be synchronized to a global timing source. In some implementations, that source may be clock 107.

Color/visible-spectrum image sequence fused with corresponding InGaAs imagery from boundary-crossing detection events for increased contextual information and situational awareness.

Frame showing return signal from ball as bright flash as it interacts with the laser boundary, optionally fused with corresponding frame from onboard color/visible camera Frames before and after the first frame in which the flash is detected can also be selected for viewing (with or without color/visible image fusion), either by manually scrolling through the frame sequence, or via an auto-generated movie clip that can be played at arbitrary frame rate Master timing and global timing hacks of when the boundary was crossed based on analysis of image frames at 60 fps.

Enhanced timing of boundary crossing event based on analysis of 10 kHz APD signal.

Figure-of-merit (or confidence level) of the detection of the event derived by the processing algorithms.

Electronic transmission of data products to local and remote league officials for use in the review process that takes place after every touchdown.

System scaling of the preferred embodiment under various conditions.

Required laser power decreases as ambient solar illumination is decreased (ie, later times of day, later days of year through fall/winter, shaded conditions, domed stadiums, night games).

Artificial ambient lighting used in NFL stadiums (i.e., metal halide high intensity discharge and LED sources) are engineered to be electro-optically efficient and therefore output trace amounts of light outside of the visible portion of the spectrum (i.e., 400-700 nm), as opposed to solar illumination whose 5777 degrees Kelvin blackbody spectrum (while peaking at ~550 nm) includes non-negligible power at wavelengths to the red of the visible portion of the electromagnetic spectrum. Therefore, required laser power will decrease in artificial lighting conditions.

Hemispherically Al-coated microspheres provide approximately 5× signal increase from laser return to detector(s) over uncoated microspheres at a given surface density. A mixture of Al-coated and uncoated spheres with similar radii could also be employed resulting in an effective signal increase of up to 5× as a function of the ratios of Al-coated to uncoated spheres distributed uniformly over the surface of the ball. This linearly reduces the required laser power.

Suppression of the spectral reflectance of the background can be achieved with spectral absorbers emplaced in the white paint that specifically absorb over the passband of the spectral filter. This reduces the required surface density of taggant.

The required laser power of the system decreases with increased taggant surface density, with increased microsphere radii, and, in the presence of significant ambient illumination, decreased laser and bandpass filter spectral widths.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system for detecting an object crossing a plane, the system including:
    an object having a surface including a reflectivity treatment applied to the surface of the object, wherein the reflectivity treatment affects the reflectivity of the object for identification of the object in a lighted environment;
    a first transmitter projecting a light plane using a light comprising a light plane wavelength, the light plane defining a boundary, wherein the light plane wavelength is not visible to the human eye;
    a first receiver for detecting a reflection of light when the object crosses the light plane defining the boundary, the receiver configured to detect light in a range of the electromagnetic spectrum including the light plane wavelength, wherein the receiver includes an image sensor comprising a plurality of sensor pixels; and
    an image processing computer configured to receive an input from the receiver including a recorded frame captured by the receiver, wherein the image processing computer processes the recorded frame for review to identify a frame showing the object crossing the boundary.

2. The system of claim 1, wherein the image processing computer analyzes the processed recorded frame to determine that one or more frame pixels of the recorded frame are saturated, wherein a saturated pixel indicates that a maximum value of the light plane wavelength is detected, which is associated with the reflection from the treated object.

3. The system of claim 1, wherein the image processing computer determines the object has crossed the boundary by comparing the received frame to a baseline frame, wherein the baseline frame does not include an object crossing the boundary.

4. The system of claim 1, wherein the system transmits the processed recorded frame for display for review of the recorded frame to determine that the object has crossed the boundary.

5. The system of claim 1, wherein the reflectivity treatment is one of a reflective treatment and an absorptive treatment.

6. The system of claim 5, wherein the reflectivity treatment is a reflective treatment including barium titanate microspheres.

7. The system of claim 5, wherein the reflectivity treatment comprises at least one of micro prisms, optimized prismatic tape, up-conversion phosphors, selective spectral reflectors, an absorptive paint, and an absorptive dye.

8. The system of claim 1, wherein the object is an American football and the boundary corresponds to one of a goal line of an American football field and a sideline of the American football field.

9. The system of claim 1, wherein the light plane wavelength is at least one of a Shortwave Infrared (SWIR) wavelength, a Midwave Infrared (MWIR) wavelength, and Longwave Infrared (LWIR) wavelength.

10. The system of claim 1, wherein the image processing computer processes the recording so a raw image appears as a conventional image to allow review for detection of an object crossing the boundary.

11. The system of claim 1, comprising a first light source and a second light source positioned on opposite sides of a sports field, wherein the first light source and the second light source are positioned at an elevated location to allow projection of the light plane without interference from an object on the sports field, wherein the object may be one of an equipment and an individual.

12. The system of claim 1, wherein the first receiver includes a narrowband optical filter to suppress received signal not at the light plane wavelength.

13. The system of claim 1, wherein the receiver records at one of 24 frames per second (fps), 30 fps, and 60 fps.

14. The system of claim 1, wherein the first transmitter includes a laser with continuous output at 1400 nm center wavelength.

15. The system of claim 1, wherein the image processing computer combines the input from the receiver with a motion picture receiver feed for analysis by a game official of a sporting event.

16. A method of detecting an object crossing a boundary, the method comprising:
   calibrating a light source to project a light plane aligned with a line on a sports field, wherein the light plane is formed using light having a light plane wavelength that is outside the visible spectrum;
   recording a sporting event played on the sports field using a receiver configured to record light in the light plane wavelength, wherein the recording includes a plurality of frames depicting sequential images showing occurrences in the sporting event;
   comparing a first frame of the recording and a reference data, wherein the reference data includes a detected intensity level of a plurality of wavelengths of light in an ambient lighting of the sports field; and
   determining an object has crossed the boundary when the first frame shows a substantial reflection of the light plane wavelength in comparison to the reference data, and wherein the object is configured to reflect the light plane wavelength of light.

17. The method of claim 16, wherein the reference data is one of a baseline data and a reference frame.

18. The method of claim 16, wherein the method further comprises:
   displaying a detection frame of the recording showing substantial reflection of the light plane wavelength with pixels corresponding to the light plane wavelength reflection as saturated pixels.

19. The method of claim 18, further comprising:
   transmitting the recording to a remote location for review of the recording.

20. The method of claim 16, wherein the light plane wavelength is at least one of a Shortwave Infrared (SWIR) wavelength, a Midwave Infrared (MWIR) wavelength, and Longwave Infrared (LWIR) wavelength.

* * * * *